United States Patent
Grobecker et al.

(10) Patent No.: US 8,784,030 B2
(45) Date of Patent: Jul. 22, 2014

(54) SCREW HAVING AN UNDERHEAD BEARING SURFACE INCLUDING LUBRICANT POCKETS

(71) Applicant: KAMAX Holding GmbH & Co. KG, Homberg (DE)

(72) Inventors: Markus Grobecker, Gieboldehausen (DE); Norbert Bietz, Rabenau-Londorf (DE); Gunther Hartmann, Alsfeld (DE)

(73) Assignee: KAMAX Holding GmbH & Co. KG, Homberg (Ohm) (DE)

( * ) Notice: Subject to any disclaimer, the term of this patent is extended or adjusted under 35 U.S.C. 154(b) by 0 days.

(21) Appl. No.: 13/737,154

(22) Filed: Jan. 9, 2013

(65) Prior Publication Data

US 2013/0183119 A1 Jul. 18, 2013

(30) Foreign Application Priority Data

Jan. 12, 2012 (DE) .................. 10 2012 100 228

(51) Int. Cl.
 *F16B 43/00* (2006.01)
(52) U.S. Cl.
 USPC ........................................ 411/534
(58) Field of Classification Search
 USPC ........ 411/10, 82.5, 337, 371.1, 378, 531, 534
 See application file for complete search history.

(56) References Cited

U.S. PATENT DOCUMENTS

| | | | | |
|---|---|---|---|---|
| 3,522,177 A | * | 7/1970 | Benz | 508/126 |
| RE27,085 E | * | 3/1971 | Weidner, Jr. | 411/371.1 |
| 3,573,111 A | * | 3/1971 | Thurston | 428/328 |
| 3,914,178 A | * | 10/1975 | Fineran et al. | 508/103 |
| 6,135,689 A | * | 10/2000 | Matsunami | 411/311 |
| 6,729,819 B2 | * | 5/2004 | Wallace | 411/11 |
| 6,789,989 B2 | * | 9/2004 | Walther | 411/186 |
| 6,789,992 B2 | * | 9/2004 | Horng et al. | 411/534 |
| 6,854,942 B1 | * | 2/2005 | Hargis | 411/369 |
| 7,521,402 B2 | * | 4/2009 | Combetta | 508/450 |
| 2003/0039527 A1 | | 2/2003 | Schatz | |
| 2004/0057813 A1 | * | 3/2004 | Horng et al. | 411/534 |
| 2009/0053008 A1 | * | 2/2009 | Yamaki | 411/386 |
| 2012/0027538 A1 | | 2/2012 | Thau et al. | |

FOREIGN PATENT DOCUMENTS

| | | |
|---|---|---|
| DE | 3641836 A1 | 6/1988 |
| DE | 10001857 A1 | 7/2001 |
| DE | 102008041391 A1 | 1/2010 |
| EP | 2 412 992 A1 | 7/2011 |

OTHER PUBLICATIONS

European Search Report in co-pending, related European Application No. 12196792.1, mailed Mar. 28, 2013.

* cited by examiner

*Primary Examiner* — Roberta Delisle
(74) *Attorney, Agent, or Firm* — Thomas | Horstemeyer, LLC

(57) ABSTRACT

A screw (2) has a head (5) including an underhead bearing surface (12). Lubricant pockets (13) are arranged at least in a part of the underhead bearing surface (12). The lubricant pockets (13) serve to contain lubricant and to release the lubricant when tightening a screw joint (1) to prevent galling effects during multiple tightening processes.

30 Claims, 5 Drawing Sheets

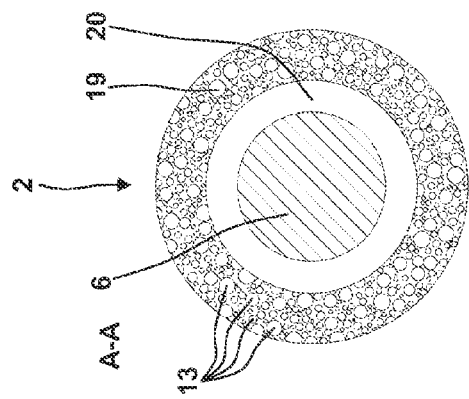
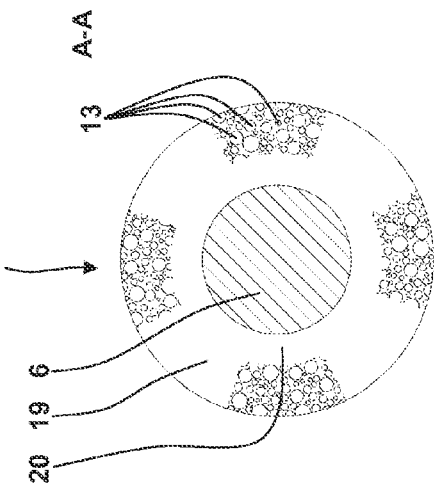
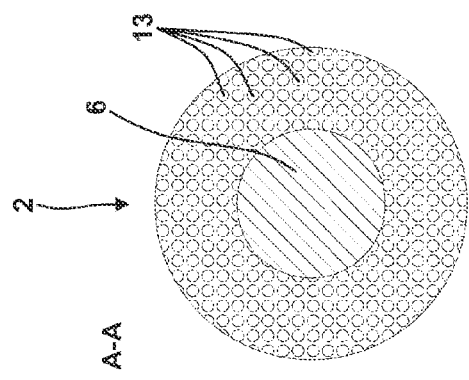
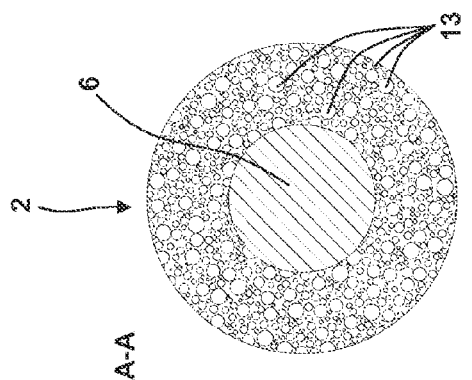
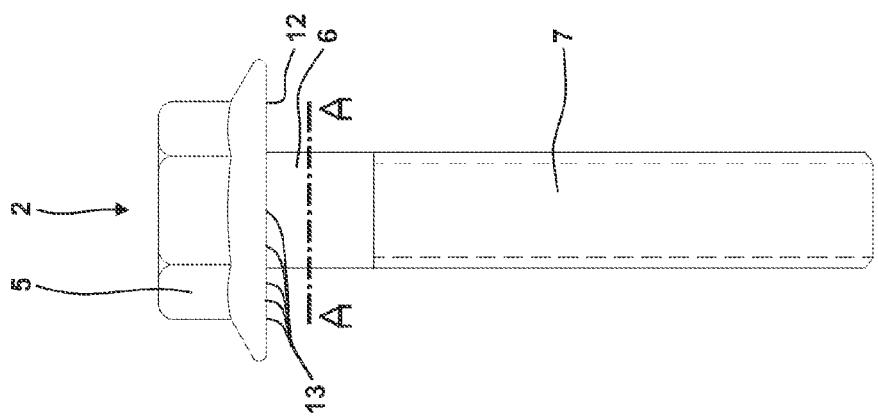

SCREW HAVING AN UNDERHEAD BEARING SURFACE INCLUDING LUBRICANT POCKETS

CROSS REFERENCE TO RELATED APPLICATIONS

This application claims priority to co-pending German Patent Application No. DE 10 2012 100 228.2 entitled "Schraube mit einer Kopfauflagefläche mit Schmiermittel-aschen", filed Jan. 12, 2012.

FIELD OF THE INVENTION

The present invention generally relates to a screw having a head including an underhead bearing surface in which lubricant pockets are arranged at least in a part of the underhead bearing surface.

BACKGROUND OF THE INVENTION

Screws having a head including an underhead bearing surface are generally known from the prior art, for example from German Patent Application No. DE 10 2008 041 391 A1, German Patent Application No. DE 100 01 857 A1 corresponding to U.S. patent application Ser. No. US 2003/0039527 A1 and German Patent Application No. DE 36 41 836 A1. None of these screws includes lubricant pockets.

Furthermore, it is known that screws include coatings for attaining defined friction between the underhead bearing surface and the component to be connected by screwing. These coatings are often furthermore used to improve corrosion protection.

If such screws are tightened for a plurality of times, i.e. they are untightened after tightening and then tightened again, this often leads to undesired galling effects. The applied coating is worn off, and there is metallic contact between the underhead bearing surface of the screw and the component to be connected by screwing. In this way, the friction acting in the contact surface is increased in a substantial and an uncontrollable way. Due to the great variation of the friction, secure multiple tightening processes are then no longer possible.

One especially observes this undesired phenomenon in case of coatings having comparatively low adhesion acting between the coating and the base metal of the screw, as it is the case with organic coatings on the basis of waxes, polymers and the like.

SUMMARY OF THE INVENTION

The present invention generally relates to a screw having a head including an underhead bearing surface in which lubricant pockets are arranged at least in a part of the underhead bearing surface.

The invention also relates to a washer for a combination with a screw having a head and an underhead bearing surface. Lubricant pockets are arranged at least in a part of the first surface of the washer facing the underhead bearing surface.

The invention further relates to a screw joint including a component, a screw and a washer. Lubricant pockets are arranged at least in a part of the underhead bearing surface of the screw and/or at least a part of the first surface of the washer.

The invention also relates to a method of manufacturing a screw with a head having an underhead bearing surface. Lubricant pockets are formed at least in a part of the underhead bearing surface.

With the invention, a novel screw as well as a washer to be combined with a screw are provided, the screw and the washer allowing for realizing screw joints being reliably tightened for a plurality of times without the occurrence of undesired galling effects. This is realized by the underhead bearing surface of the screw and/or the first surface of the washer facing the underhead bearing surface including impressions or dents to hold and contain lubricant. These impressions are designated as lubricant pockets in this application. Lubricant is introduced into these lubricant pockets, the lubricant being successively released when tightening the screw joint due to the deformation of the underhead bearing surface of the screw resulting therefrom. This results in a reduction and a standardization of the frictional forces acting between the underhead bearing surface and the surface getting in touch therewith.

The invention intentionally abandons the goal of achieving a surface of the underhead bearing surface of the screw being as smooth as possible, and it instead arranges impressions there. The impressions serve to contain lubricant. These lubricant containing impressions or lubricant pockets form a lubricant reservoir under the head of the screw, the reservoir being used when tightening the screw joint. Galling often begins during tightening of a screw joint when there are greater pretensioning forces, i.e. rather during the second half and the second third, respectively, of the tightening process. The novel lubricant pockets now especially release lubricant during this relevant part of the tightening process since deformation of the underhead bearing surface causes the lubricant to be squeezed from the impressions. In this way, fresh unconsumed lubricant is always available during each phase of the tightening process and galling is reliably prevented and reduced, respectively.

The novel lubricant pockets may also be used when producing screw joints with one or more components being made of aluminum. In such screw joints in which the component is made of a softer material than the screw, there often are galling effects in the prior art. These effects are now prevented and at least substantially reduced, respectively, by the novel lubricant pockets.

Another advantage is that the lubricant pockets may also receive wear particles and that galling effects are also minimized in this way.

It is preferred if the lubricant pockets are circumferentially closed as seen in a cross-sectional view. Due to this design, the lubricant is reliably maintained in the pockets, and it is released only after a respective elastic or elastic and plastic deformation of the underhead bearing surface is achieved during the tightening process. It is to be understood that only some of the lubricant pockets or all lubricant pockets may be designed to be circumferentially closed as seen in a cross-sectional view. Depending on the manufacturing process of the lubricant pockets, it is rather likely that the radial outer lubricant pockets—i.e. the lubricant pockets at the outer edge of the underhead bearing surface—are not designed to be closed.

The lubricant pockets especially have an average diameter corresponding to approximately maximally 20% of the radial width of the underhead bearing surface. Especially, the pockets are no structures in the form of grooves, channels and the like being continuous in a circumferential direction, but they are instead smaller entities.

The lubricant pockets may be arranged to be uniformly distributed and not to be continuous in a radial direction and in a circumferential direction of the underhead bearing surface. Due to the distributed arrangement of the pockets, one approximately attains a uniform distribution and contribution of lubricant during the tightening process.

The lubricant pockets may have an average diameter of between approximately 50 to 500 μm, especially between approximately 100 to 300 μm. Thus, they are small impressions which could also be interpreted as a certain surface roughness. In this sense, for forming the lubricant pockets, the underhead bearing surface may have a surface roughness $R_z$ of between 10 to 100 μm, especially between approximately 15 to 50 μm. The surface roughness is especially chosen such that the surface has a certain waviness without sharp tips. The tips are preferably rounded.

The underhead bearing surface may include projecting portions and deepened portions, the deepened portions forming the lubricant pockets, the projecting portions being designed to be rounded and especially to have an average diameter of between approximately 50 to 500 μm, especially between approximately 100 to 300 μm.

The lubricant pockets may be arranged in the entire region of the underhead bearing surface or only in a part of the underhead bearing surface, especially in a radial outer part. Galling often begins in a radial outer part of the underhead bearing surface such that it makes special sense to arrange the lubricant pockets in this portion.

The lubricant pockets may be produced by cold forming. In this way, the lubricant pockets can be economically and reliably manufactured in an automated way. One possibility is to produce them by a cold forming die (or a mould), the die having a surface being complementary to the underhead bearing surface of the screw including the lubricant pockets. This means that the die with its projecting portions imprints the impressions forming the lubricant pockets into the underhead bearing surface.

It is also possible to arrange different lubricant pockets at the underhead bearing surface. For example, the lubricant pockets being arranged in the radial inner portion may have a different shape and/or size than the lubricant pockets being arranged in the radial outer portion.

The lubricant may be especially dry lubricant, polymer lubricant, zinc flake coating or pastes.

The screw and/or the washer is preferably made of metal. The screw is especially designed as a high strength screw, and it may serve for producing screw joints at automobiles, for example. A high strength screw is especially to be understood as a screw of the strength classes 8.8, 10.9 and 12.9. However, the screw may also include a bainite structure that has been produced by austempering such that the screw has an even greater strength and maximum ductility values. Such screws are also designated as ultra high strength screws, and they may have tensile strengths of 1400 MPa or more. Preferably, the screw includes at least one metric thread.

Advantageous developments of the invention result from the claims, the description and the drawings. The advantages of features and of combinations of a plurality of features mentioned at the beginning of the description only serve as examples and may be used alternatively or cumulatively without the necessity of embodiments according to the invention having to obtain these advantages. Without changing the scope of protection as defined by the enclosed claims, the following applies with respect to the disclosure of the original application and the patent: further features may be taken from the drawings, in particular from the illustrated designs and the dimensions of a plurality of components with respect to one another as well as from their relative arrangement and their operative connection. The combination of features of different embodiments of the invention or of features of different claims independent of the chosen references of the claims is also possible, and it is motivated herewith. This also relates to features which are illustrated in separate drawings, or which are mentioned when describing them. These features may also be combined with features of different claims. Furthermore, it is possible that further embodiments of the invention do not have the features mentioned in the claims. The number of the features mentioned in the claims and in the description is to be understood to cover this exact number and a greater number than the mentioned number without having to explicitly use the adverb "at least". For example, if an underhead bearing surface is mentioned, this is to be understood such that there is exactly one underhead bearing surface or there are two underhead bearing surfaces or more underhead bearing surfaces. If however it is intended to mention the exact number of a feature, the adjective "exactly" is used before the respective feature. Additional features may be added to these features, or these features may be the only features of the respective product.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

FIG. 3 is a view of an exemplary embodiment of a novel screw.

FIG. 4 is a view of a first exemplary embodiment of the novel underhead bearing surface of the screw according to line A-A in FIG. 3.

FIG. 5 is a view of a second exemplary embodiment of the novel underhead bearing surface of the screw according to line A-A in FIG. 3.

FIG. 6 is a view of a third exemplary embodiment of the novel underhead bearing surface of the screw according to line A-A in FIG. 3.

FIG. 7 is a view of a fourth exemplary embodiment of the novel underhead bearing surface of the screw according to line A-A in FIG. 3.

DESCRIPTION OF THE DRAWINGS

Figure 1:
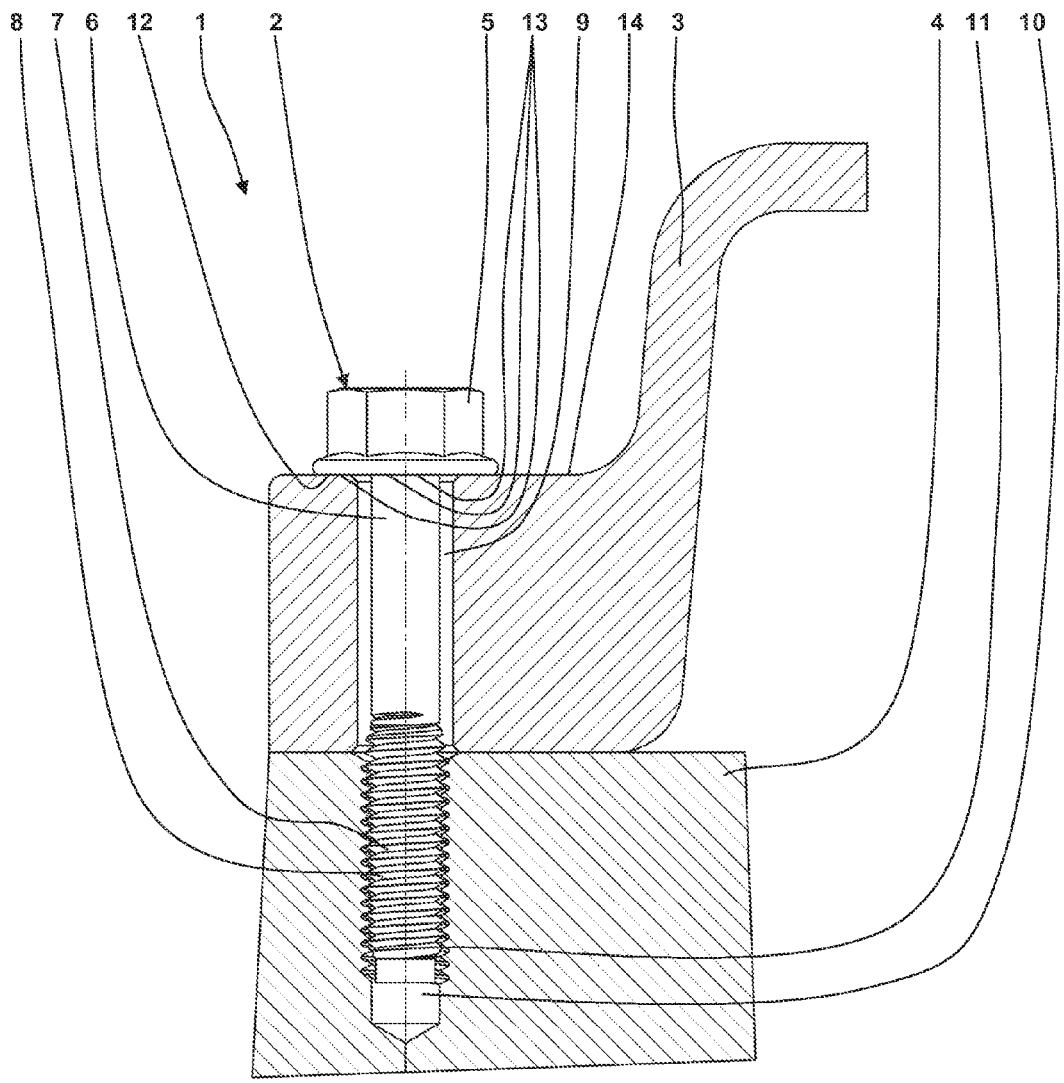
FIG. 1 is a view of a first exemplary embodiment of the novel screw joint including a screw and a component.

Referring now in greater detail to the drawings, FIG. 1 illustrates a first exemplary embodiment of a novel screw joint 1 including a screw 2, especially a high strength screw, and a first component 3 and a second component 4. The screw 2 includes a head 5, a shank portion 6 and a threaded portion 7 having an outer thread 8. The first component 3 includes a bore 9, and the second component 4 includes a bore 10. The bore 10 has an inner thread 11 corresponding to the outer thread 8 of the screw 2. The clamp load being required for attaining the secure screw joint 1 is realized by the engaging threads 8, 11 and the underhead bearing surface 12 of the head 5 of the screw 2.

A plurality of lubricant pockets 13 is arranged in the region of at least a part of the underhead bearing surface 12 of the screw 2. Due to their small size, the lubricant pockets 13 are not to be seen in FIG. 1 and thus the reference lines only indicate their general position.

The lubricant pockets 13 contain and hold lubricant (not illustrated) which is released when the screw joint 1 is tightened and which leads to a reduction of frictional forces. In the present case, the released lubricant is then located between the underhead bearing surface 12 of the screw 2 and a surface 14 of the component 3 facing the surface 12. The design of the lubricant pockets 13 will be further explained hereinbelow and especially in relation to FIGS. 4-7 and 9.

Figure 2:
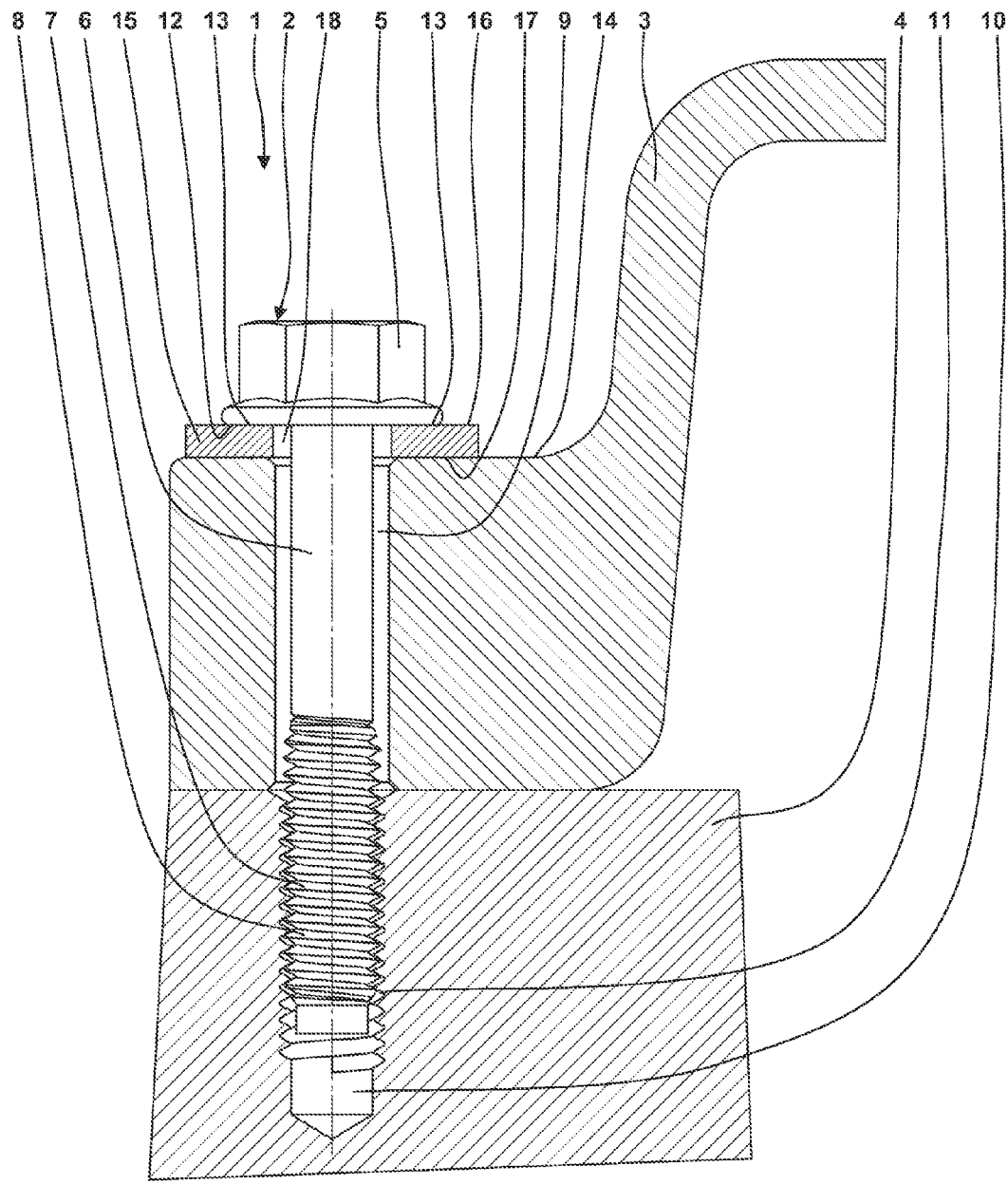
FIG. 2 is a view of a second exemplary embodiment of the novel screw joint including a screw, a washer and a component.

FIG. 2 illustrates a second exemplary embodiment of the novel screw joint 1 including the screw 2, a washer 15 and the components 3, 4. With the exception of the washer 15, the elements are identical such that it is referred to the above description relating to FIG. 1.

The washer 15 has a first surface 16 and an opposite second surface 17. The washer 15 includes a bore 18 through which the shank portion 6 of the screw 2 extends.

The screw 15 in the region of its first surface 16 includes a multitude of lubricant pockets 13 which in combination with the underhead bearing surface 12 of the head 5 of the screw 2 serve to prevent galling effects when tightening the screw joint 1. Additional lubricant pockets 13 may be arranged in the region of the second surface 17 of the washer 15. In this embodiment, the underhead bearing surface 12 of the screw 2 may also include lubricant pockets 13.

FIG. 3 illustrates a screw 2 to explain different exemplary designs and shapes of the lubricant pockets 13 by a section according to line A-A.

FIGS. 4-7 illustrate such different designs and shapes of the lubricant pockets 13 by a section through line A-A in FIG. 3. These and other designs of the lubricant pockets 13 may also be used in a corresponding way at the washer 15. It is understood that, in this case, the shank portion 6 being illustrated in the center portion is then replaced by the bore 18.

It is to be seen in FIG. 4 that the lubricant pockets 13 are designed to be circumferentially closed as seen in the cross-section. However, this does not necessarily apply to all lubricant pockets 13 and especially not to lubricant pockets 13 being arranged directly in the radial outer end portion and in the radial inner end portion, respectively, of the underhead bearing surface 12. In the present case, the lubricant pockets 13 are arranged in a uniformly distributed way and such that they are not continuous in the circumferential direction of the underhead bearing surface 12. The lubricant pockets 13 have an average diameter corresponding to approximately maximally 20% of the radial width of the underhead bearing surface 12.

In the embodiment of the screw 2 according to FIG. 5, the lubricant pockets 13 have different sizes and diameters, respectively. The lubricant pockets 13 are arranged to be distributed over the entire underhead bearing surface 12 in an irregular way (i.e. not uniformly).

FIG. 6 illustrates another exemplary embodiment of the lubricant pockets 13 which again have different diameters. In this case, the lubricant pockets 13 are only arranged in a part of the underhead bearing surface 12 and, here, only in a radial outer part 19. In contrast, no lubricant pockets 13 are arranged in a radial inner part 20 of the underhead bearing surface 12.

In the embodiment of the screw 2 according to FIG. 7, the lubricant pockets 13 again have different diameters, and they are arranged in the radial outer part 19, but not in the radial inner part 20 of the underhead bearing surface 12. However, they also only extend over a part of the radial outer part 19 in a circumferential direction.

Figure 8:
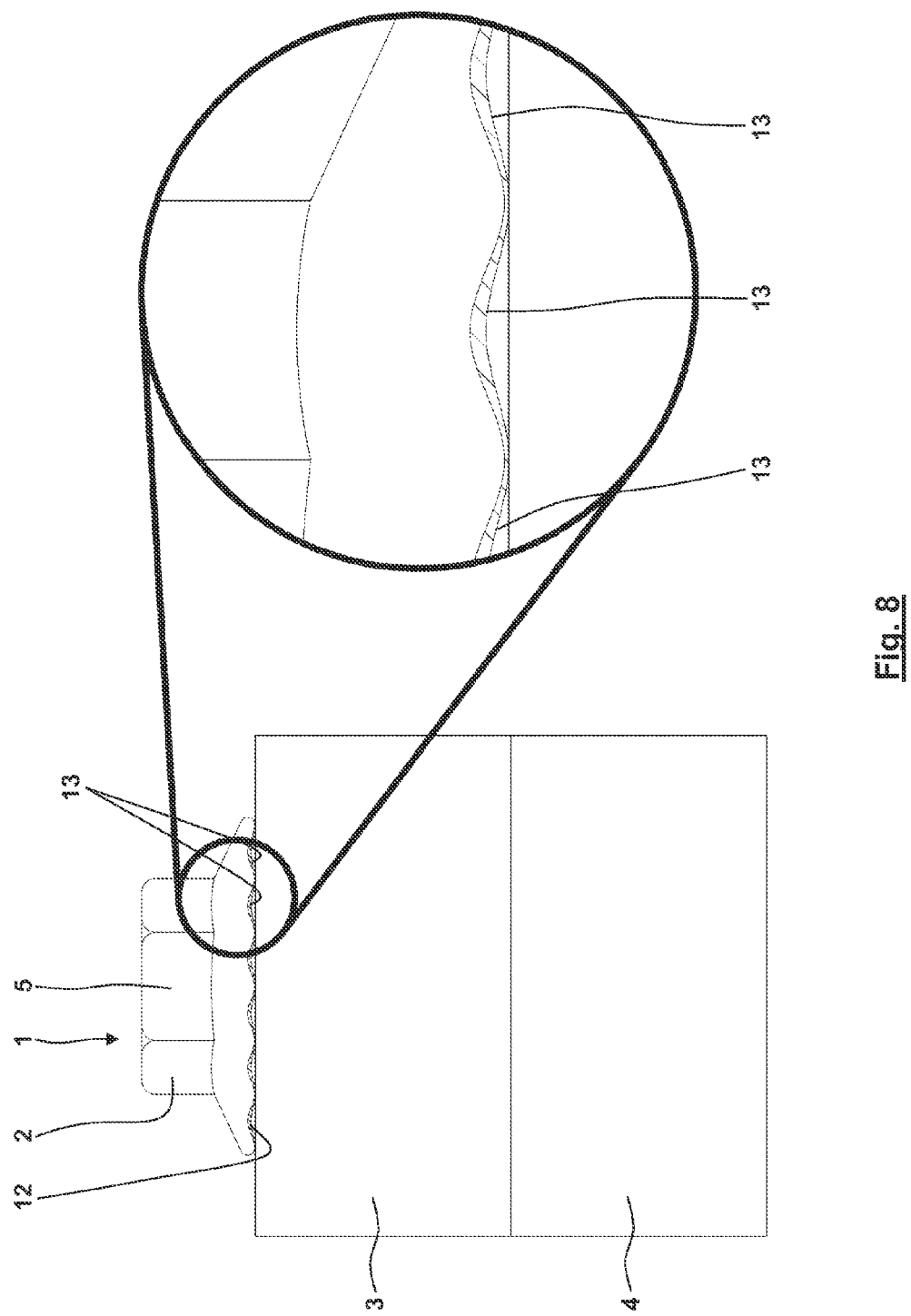
FIG. 8 is view of a another exemplary embodiment of the novel screw joint.

FIG. 8 illustrates another view of the novel screw joint 1. This view is not a sectional view. In this view, the lubricant pockets 13 are schematically illustrated. The lubricant pockets 13 are illustrated in an exaggerated way such that they are bigger than in reality. In reality, they are not distributed over the circumference of the underhead bearing surface 12 in its radial outer portion 19 in such a uniform way. This illustration primarily serves to emphasize the principle of the lubricant pockets 13 being impressions (or dents, cavities, recesses, openings) being located in the underhead bearing surface 12 that contain lubricant.

Figure 9:
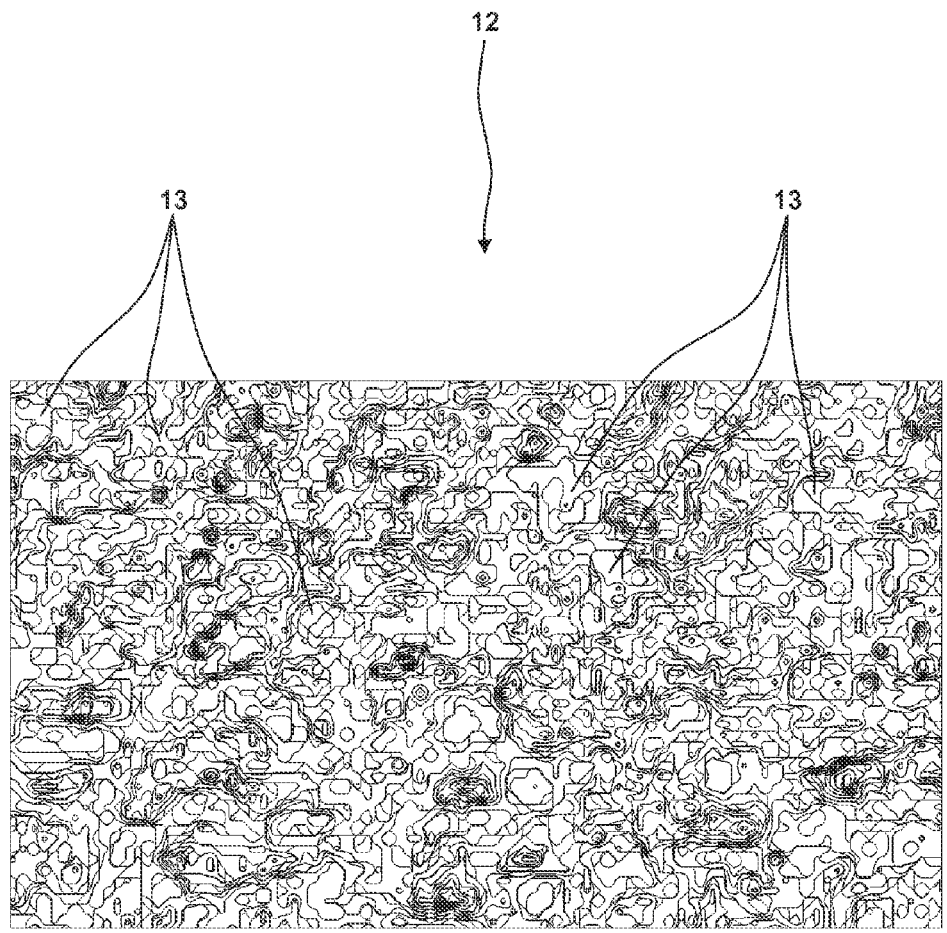
FIG. 9 is a sectional view of another exemplary embodiment of the novel lubricant pockets.

FIG. 9 finally illustrates a more realistic illustration of a part of the underhead bearing surface 12. It is to be seen that the lubricant pockets 13 in this embodiment actually are arranged to be distributed over the underhead bearing surface 12 in an irregular way and that they have different diameters and shapes. Such a design may be produced by cold forming and especially by a cold forming die (or mould).

Many variations and modifications may be made to the preferred embodiments of the invention without departing substantially from the spirit and principles of the invention. All such modifications and variations are intended to be included herein within the scope of the present invention, as defined by the following claims.

We claim:

1. A screw, comprising:
   a head, the head having an underhead bearing surface, the underhead bearing surface having a radial direction, a circumferential direction and a radial width; and
   a plurality of lubricant pockets containing lubricant,
   the lubricant pockets being designed as cold formed lubricant pockets,
      the lubricant pockets being arranged at least in a part of the underhead bearing surface,
      the lubricant pockets being arranged in an irregular way,
      the lubricant pockets being designed not to be continuous in the radial direction and in the circumferential direction of the underhead bearing surface, and
      the lubricant pockets having an average diameter of between approximately 50 to 500 µm and corresponding to approximately maximally 20% of the radial width of the underhead bearing surface.

2. The screw of claim 1, wherein the lubricant pockets are designed to be circumferentially closed as seen in cross-section.

3. The screw of claim 1, wherein the lubricant pockets are only arranged in a part of the underhead bearing surface.

4. A screw joint, comprising:
   a component including a surface and a bore;
   a screw having a head including an underhead bearing surface, the screw extending through the bore of the component;
   a washer having a first surface and an opposite second surface, the washer being arranged between the underhead bearing surface of the screw and the surface of the component, the first surface of the washer beinq arranged to face the underhead bearing surface of the screw and the second surface of the washer being arranged to face the surface of the component; and
   a plurality of lubricant pockets, the lubricant pockets being designed as cold formed lubricant pockets and being arranged in at least a part of the underhead bearing surface of the screw.

5. The screw joint of claim 4, wherein a plurality of lubricant pockets is arranged at least in a part of the first surface of the washer.

6. The screw joint of claim 4, wherein the lubricant pockets are designed to be circumferentially closed as seen in cross-section.

7. The screw joint of claim 4, wherein the lubricant pockets have an average diameter of between approximately 50 to 500 μm.

8. The screw joint of claim 4, wherein the lubricant pockets have an average diameter of between approximately 100 to 300 μm.

9. A screw, comprising:
a head, the head having an underhead bearing surface; and
a plurality of lubricant pockets, the lubricant pockets being designed as cold formed lubricant pockets and being arranged at least in a part of the underhead bearing surface.

10. The screw of claim 9, wherein the lubricant pockets are designed to be circumferentially closed as seen in cross-section.

11. The screw of claim 10, wherein the underhead bearing surface has a radial direction and a circumferential direction, the lubricant pockets being arranged to be distributed in an irregular way and that they are designed not to be continuous in the radial direction and in the circumferential direction of the underhead bearing surface.

12. The screw of claim 9, wherein the underhead bearing surface has a radial direction and a circumferential direction, the lubricant pockets being arranged to be distributed in an irregular way and that they are designed not to be continuous in the radial direction and in the circumferential direction of the underhead bearing surface.

13. The screw of claim 9, wherein the underhead bearing surface has a radial width, the lubricant pockets having an average diameter corresponding to approximately maximally 20% of the radial width of the underhead bearing surface.

14. The screw of claim 9, wherein the lubricant pockets have an average diameter of between approximately 50 to 500 μm.

15. The screw of claim 9, wherein the lubricant pockets have an average diameter of between approximately 100 to 300 μm.

16. The screw of claim 9, wherein the underhead bearing surface has an average surface roughness $R_z$ of between approximately 10 to 100 μm for forming the lubricant pockets.

17. The screw of claim 9, wherein the underhead bearing surface has an average surface roughness $R_z$ of between approximately 15 to 50 μm for forming the lubricant pockets.

18. The screw of claim 9, wherein the underhead bearing surface includes projecting portions and deepened portions, the deepened portions forming the lubricant pockets, the projecting portions being designed to be rounded and to have an average diameter of between approximately 50 to 500 μm.

19. The screw of claim 9, wherein the underhead bearing surface includes projecting portions and deepened portions, the deepened portions forming the lubricant pockets, the projecting portions being designed to be rounded and to have an average diameter of between approximately 100 to 300 μm.

20. The screw of claim 9, wherein the lubricant pockets are only arranged in a part of the underhead bearing surface.

21. The screw of claim 9, wherein the underhead bearing surface has radial outer part, the lubricant pockets only being arranged in the radial outer part.

22. A washer for combination with a screw, the screw having a head including an underhead bearing surface, the washer comprising:
a first surface facing the underhead bearing surface of the screw; and
a plurality of lubricant pockets, the lubricant pockets being designed as cold formed lubricant pockets and being arranged at least in a part of the first surface.

23. The washer of claim 22, wherein the lubricant pockets are designed to be circumferentially closed as seen in cross-section.

24. The washer of claim 22, wherein the first surface has a radial direction and a circumferential direction, the lubricant pockets being arranged to be distributed in an irregular way and that they are designed not to be continuous in the radial direction and in the circumferential direction of the first surface.

25. The washer of claim 22, wherein the first surface has a radial width, the lubricant pockets having an average diameter corresponding to approximately maximally 20% of the radial width of the first surface.

26. The washer of claim 22, wherein the lubricant pockets have an average diameter of between approximately 50 to 500 μm.

27. The washer of claim 22, wherein the lubricant pockets have an average diameter of between approximately 100 to 300 μm.

28. The washer of claim 22, wherein the first surface has an average surface roughness $R_z$ of between approximately 10 to 100 μm for forming the lubricant pockets.

29. The washer of claim 22, wherein the first surface has an average surface roughness $R_z$ of between approximately 15 to 50 μm for forming the lubricant pockets.

30. A screw, comprising:
a head, the head having an underhead bearing surface; and
a plurality of lubricant pockets, the lubricant pockets being only arranged in a part of the underhead bearing surface.

* * * * *